Figure 1:
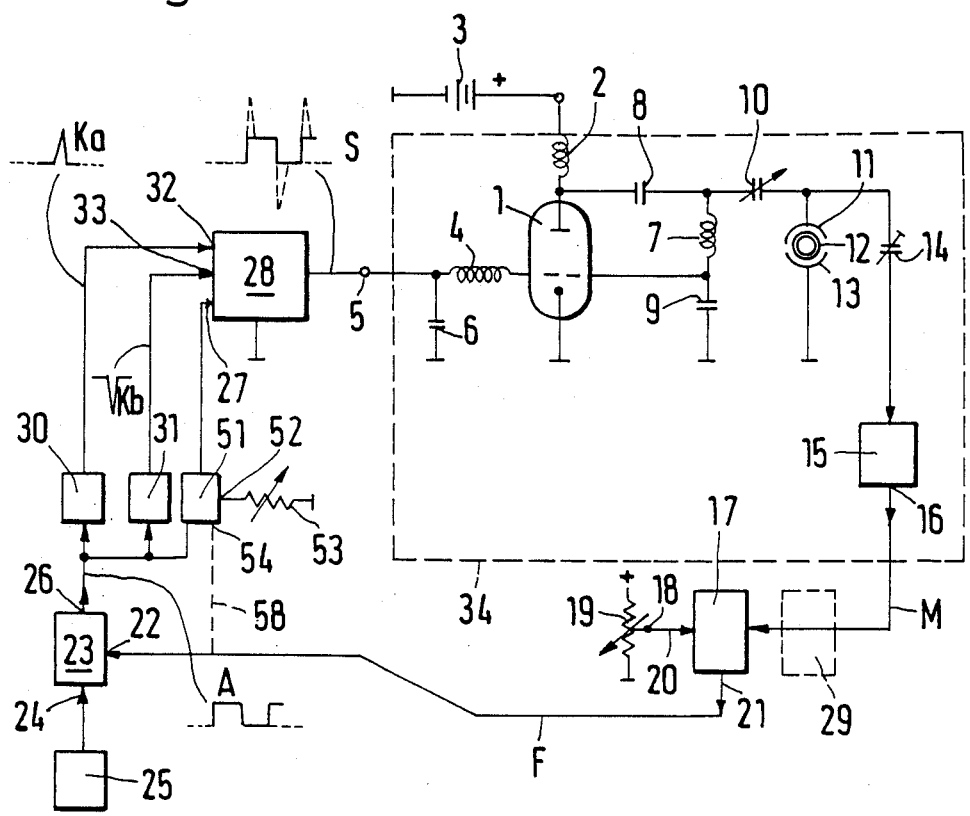

United States Patent [19]

Knobbe

[11] Patent Number: 4,978,929
[45] Date of Patent: Dec. 18, 1990

[54] OSCILLATOR FOR SUPPLYING A GAS DISCHARGE DEVICE

[75] Inventor: Karl-Heinz Knobbe, Ellerbek, Fed. Rep. of Germany

[73] Assignee: Herfurth GmbH, Hamburg, Fed. Rep. of Germany

[21] Appl. No.: 453,914

[22] Filed: Dec. 20, 1989

[30] Foreign Application Priority Data

Dec. 22, 1988 [DE] Fed. Rep. of Germany ....... 3843210

[51] Int. Cl.$^5$ .......................... H03B 5/10; H03L 5/00; H01S 3/097
[52] U.S. Cl. .................................... 331/173; 315/283; 331/170; 331/183; 372/38; 372/82

[58] Field of Search ............... 331/167, 169, 170, 171, 331/173, 183; 372/38, 81, 82; 315/246, 247, 268, 283, 287

[56] References Cited

U.S. PATENT DOCUMENTS 4,872,178 10/1989 Egawa .................................. 372/82

Primary Examiner—Siegfried H. Grimm
Attorney, Agent, or Firm—Antonelli, Terry, Stout & Kraus

[57] ABSTRACT

An oscillator circuit for supplying a gas discharge path. A self-oscillating oscillator is controlled by pulses whose width, amplitude, and/or frequency are regulated as necessary to stabilize the oscillator output power, energy, and/or voltage.

21 Claims, 1 Drawing Sheet

OSCILLATOR FOR SUPPLYING A GAS DISCHARGE DEVICE

The present invention relates to an oscillator for supplying a gas discharge device such as a gas laser, the oscillator having a power stage to which energy is supplied from an operating voltage source and which delivers to the gas laser high-frequency electromagnetic vibrational energy in the form of pulses, the width and, if necessary, the amplitude and/or the frequency of the pulses being regulatable. Thus, with the aid of the high-frequency discharges, the gas laser is excited. For this purpose, electrodes are fitted outside a resonator tube, e.g. of glass, and connected to the high-frequency oscillator. While any frequency of pulses may be provided, it has been shown that higher frequencies, e.g. 13.56 MHz to 27.12 MHz, are optimal because the required voltage is reduced with increasing frequency.

The optimum conditions for the gas discharge, e.g. in a laser, depend, inter alia, on the composition of the gas, on the pressure, and on the temperature of the plasma excited by the discharge. That is why it is necessary to maintain the high-frequency voltage very largely constant.

In order to ensure the requisite ionization for producing the plasma in the gas, a minimum field strength of the alternating pulsating field within the discharge chamber between the electrodes is necessary, and for the maintenance of the plasma, the power supply voltage has to exceed a minimum value. If one wishes to obtain a medium output power, the discharge path has to be operated in a pulsed manner, i.e. so that intervals with power exceeding the minimum required alternate with intervals in which the gas discharge path is not excited. For this purpose, the oscillator may be operated in a pulsed manner. Until now such an oscillator consisted of a high-frequency power amplifier with a series-connected pulse modulator. Most such amplifiers are multistage and are relatively expensive.

The present invention is an oscillator of the type stated that is simpler and less costly to construct but, just like known oscillators, is nevertheless easy to operate. According to the invention, the oscillator is constructed so as to be self-oscillating and is supplied with an operating voltage that is not maintained constant. Further, the oscillator is put into operation by means of control pulses the width of which and, if necessary, the frequency of which, can be regulated.

Normally, the oscillations of a self-oscillating oscillator are strongly dependent on the operating voltage, and so the operating voltage has to be maintained constant in order to create constant operating conditions. The control system heretofore necessary significantly increases the overall expenditure. By dispensing with stabilization of the operating voltage and by employing a self-oscillating oscillator, according to the invention, considerably less expensive switching elements are needed.

Since the regulation is dependent upon a measured value which, in turn, depends on the emitted radiation, influences of the operating voltage are also included in the regulation.

As a rule, a self-oscillating oscillator requires a certain amount of time to reach its full amplitude. Similarly, when being switched off, a certain time is required for it to fully die away. However, for precise regulation, particularly with respect to more rapid fluctuations of the operating voltage source, it is desirable that the oscillator can be switched on and off in a precise manner, i.e. that to all intents and purposes it attains its full power at once and ceases to oscillate immediately. In that case it is possible to immediately correct especially faster fluctuations as may occur in an operating voltage source supplied from an a.c. power line. A stable operating condition is thus safely maintained. According to an advantageous embodiment of the invention, this is achieved in that each control pulse has superimposed thereon an additional starting pulse and an additional terminating pulse. Not only gradually occurring changes, e.g. temperature-dependent changes, but also more rapid changes as may be caused by the operating voltage, are thus accommodated by the regulation without any additional expenditure so that, on the whole, stable operation is ensured. The regulation can be improved still further if, according to a special embodiment of the invention, a part of the measured value is derived from the supply voltage.

In the entire system of the gas discharge path, particularly in a laser system, a certain thermal inertia exists having, in comparison with the pulse frequency, a large time constant. This results in an integration of the discontinuous power supply to the gas discharge path due to the thermal effects. Even when operating with full power, as occurs in the case of continuous oscillation generation (CW operation), it is possible that control pulses with a small blanking interval still occur. Typical pulse times lie between 30 and 300 $\mu$s, and the pulse times are between 10 and 90% of the pulse period.

The range of change for the output delivered is thus given by these pulse times and, in the example indicated, amounts to 1:9. According to an advantageous further feature of the invention, it is possible to increase the change or adjustment range of the oscillator output with the aid of simple means in that, in connection with the width and, if necessary, the frequency of the control pulses, the amplitude of the oscillator vibrations is changed. This can be effected by means of a circuit path which is independent of the control pulses, e.g. by altering the modulating range of an oscillator valve. A discontinuous change is also possible, e.g. by changing over an operating voltage since the requisite continuous regulation is ensured by means of the control pulses. Expediently, the oscillator amplitude is increased with increasing width of the control pulses. On the other hand, it is possible for the oscillator amplitude to be reduced with diminishing width of the control pulses. If a specific oscillator amplitude is thus delivered for the shortest pulse time which ensures safe operation of the gas discharge path, in particular in a gas laser, it is possible to substantially increase the power beyond the aforesaid ratio of 1:9 when the pulse time is extended and a simultaneous increase of the amplitude in the oscillator vibrations generated is effected.

Moreover, the increase in the oscillator amplitude may be effected with a greater time constant, hence more slowly than the regulation of the width of the control pulses, while, with the aid of the control pulses, it is possible to effect any possible faster changes which only cover a smaller power range.

In accordance with one embodiment of the invention, it is possible to vary the amplitude of the control pulses, in particular in an amplitude modulator, it being possible for an adjustment value to be supplied to the amplitude modulator. It is also possible to vary the amplitude by means of an amplifier stage transmitting the control pulses to which an adjustment value, e.g. for varying the amplification factor, is supplied. The adjustment value can in this case depend on the radiation-dependent measured value.

A simple solution results when the measured value is take from the electrode circuit.

The regulation may be effected on constant high-frequency power in that a measured value desired from the high-frequency power is maintained constant with respect to a control value. It is also possible for the high-frequency power to be measured and regulated for constant operation (power times time) preferably with each pulse period.

According to another embodiment, the high-frequency voltage at the electrodes of the gas discharge path can be measured and then maintained constant by the control. Expediently, the high-frequency voltage can be measured at the electrodes, and the voltage-time-area of the pulses can be maintained constant.

As a rule, the power in the plasma depends, subsequent to a certain function, e.g. a quadratic function, upon the electrode voltage or its change, as a result of which, with the power change, the operational values of the plasma are affected as well. That is why it is expedient, when measuring the electrode voltage, to influence the pulse length subsequent to a relevant non-linear, e.g. exponential, function or a function in accordance with a power law. Their form, in particular the exponent of a power, can be appropriately adjusted in order to stabilize the desired properties of the plasma.

According to another embodiment of the invention, it is possible to measure and maintain constant the radiation output power of the gas discharge path, e.g. of a laser.

By preference it is possible to construct the automatic regulation in an integrating manner and to thus regulate a mean value with a certain time constant so as to render the same constant.

According to an advantageous embodiment, within the range of each energy pulse the measured value is determined and the following energy pulses are subjected to a correction by the evaluation of said measuring value. In this way, a type of forward control is achieved, and the control precision, and thus the control rate as well, are clearly improved.

The adjustment range of the control pulses is expediently selected in such a way that the control range, by changing the width of the control pulses, is so large that even when operating with full power to the gas discharge path, especially a gas laser, control pulses with a small blanking gap still occur. Consequently, even then a certain control corresponding to fluctuations of the operating voltage or the like is possible, and it is not as if an invariable value of the activation voltage has been reached.

It is expedient for the oscillator and the gas discharge path assembly, e.g. the laser, to be housed within a single casing and to be interconnected by coupling members that are preferably tuned. In this way a space-saving construction is obtained because the high-frequency connections between the oscillator and the gas discharge path are constructed so as to be particularly short, and only space-saving coupling members establish the connection.

Figure 2:
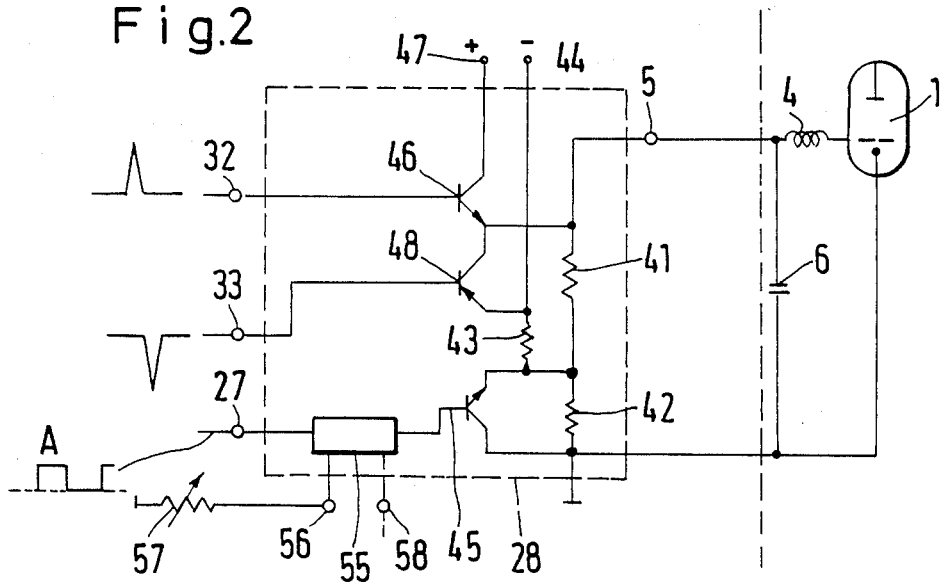

Since the parts of the oscillator which carry the high frequency as well as the gas discharge path itself are capable of producing high-frequency interference, according to an advantageous further development of the invention, the casing for high-frequency oscillation is constructed so as to provide screening or shielding so that appreciable interference from the discharge into the environment In the following, the invention will be explained in greater detail by way of example with the aid of the drawing, in which:

FIG. 1 shows a self-oscillating oscillator with a coupled laser and switching stages for activation in accordance with a preferred embodiment of the present invention; and FIG. 2 shows a grid control stage suitable for incorporation into the oscillator of FIG. 1.

In FIG. 1, a triode 1 is coupled by an anode choke 2 to the positive side of an operating voltage source 3, the negative side of which is connected to ground. The cathode of the triode 1 is likewise connected to ground. Width-modulated control pulses are supplied to the grid of triode 1 via a grid choke 4 from a control terminal 5. The junction of choke 4 and control terminal 5 is coupled to ground by filter capacitor 6. One end of a resonance circuit inductance 7 is coupled by capacitor 8 to the anode of triode 1, while the other end of inductance 7 is connected to the grid of triode 1 and is coupled to ground by capacitor 9. Triode 1 is thus connected as a self-oscillating oscillator, and it is possible, if desired, to insert a resonance element, e.g. a quartz resonator to stabilize the frequency.

The junction of inductance 7 and capacitor 8 is coupled by variable capacitor 10 to an electrode 11 of a laser resonator 12 forming a gas discharge path, the other electrode 13 of which is connected to ground. In the resonator 12, a gas plasma is excited when a high-frequency a.c. voltage is applied. A part of the high-frequency voltage on electrode 11 is supplied, via a preferably adjustable capacitor 14, to a demodulator 15. By means of rectification, a pulsating d.c. voltage is obtained from demodulator 15. This pulsating d.c. voltage is integrated to provide a mean value M which is supplied from the output 16 of demodulator 15 to the first input of a comparator 17. Comparator 17 compares voltage M with a adjustable control voltage which is supplied from the tap 18 of a potentiometer 19 to the second input 20 of comparator 17. Potentiometer 19 is coupled between a positive d.c. voltage source and ground.

Variations in the high-frequency voltage on the laser 12 from the control value cause an error signal F to appear at the output 21 of comparator 17. The comparator output F is supplied to the control input 22 of a pulse generator 23. The clock input 24 of pulse generator 23 is connected to a clock generator 25. In pulse generator 23, drive pulses A are formed, the width of which is varied according to the error signal F from the output 21 of comparator 17. These width-wise-modulated drive pulses A are supplied from output 26 of pulse generator 23 to the input 27 of a grid control stage 28, the output of which is connected to control terminal 5 of the oscillator circuit of triode 1.

By means of adjustable capacitor 10, the high-frequency voltage on the electrodes 11, 13 is adjusted for optimum operation of the laser resonator 12. By means of divider capacitor 14 or the switching elements in rectifier stage 15, the magnitude of the d.c. voltage value M, obtained by rectification of the high-frequency voltage, is adjusted at the input of comparator 17, so that the corresponding voltage magnitude of the activation control pulses A at the input 27 of the grid control stage 28 results in oscillator operation with the nominal value of the operating voltage from source 3.

If the amplitude of the high-frequency voltage pulses falls off, for instance, when the operating voltage decreases, the activating pulse A, and thus also the control pulse S, are extended due to the depicted control assembly, including rectifier 15, comparator 17, and pulse generator 23, and the pulse gap is correspondingly reduced so that more energy is delivered from triode 1 to the laser resonator 12. In this way the mean value of the high-frequency voltage on the electrodes 11, 13 is again increased towards the control value.

The power supplied to the plasma in the laser resonator depends in a non-linear manner on the high frequency voltage taken from the electrodes 11 and 13, via the divider capacitor 14. This high frequency voltage is measured by rectification in the stage 15, for example, in accordance with a quadratic law. The gas discharge path itself is able to contribute to the non-linear dependence owing to its discharge characteristic. Accordingly, it may be expedient to reduce the error signal F of output 21, and so the voltage obtained from output 16 of rectifier 15 is applied across a function stage 29 where it is deformed in accordance with non-linear functions to be considered.

For the regulation, defined slopes of the pulse of high-frequency voltage delivered by the self-oscillating oscillator are desirable. For this purpose, according to an advantageous embodiment of the invention, the drive pulses A from the output 26 of the pulse generator 23 are also supplied to a first conversion stage 30 and a second conversion stage 31. First conversion stage 30 supplies a brief positive peak pulse Ka to the input 32 of grid control stage 28. Pulse Ka is superimposed upon the start of the gating drive pulse A supplied to input 27 so as to gate triode 1 up to the maximum possible power. In order to also achieve as rapid as possible blocking of the oscillator, a brief negative peak blocking pulse Kb is supplied by conversion stage 31 to the input 33 of grid control stage 28. Pulse Kb, within the shortest time possible, renders triode 1 de-energized and blocks the same. Thus drive pulses S are generated with peaks as depicted in dashed lines in FIG. 1.

The components around triode 1 and laser 12 carrying the high frequency are enclosed in a high frequency-impervious manner in a casing, indicated by the dashed line 34, in order to prevent escape of interference fields to the outside.

In order to increase the modulation range of the high-frequency power of the oscillator, according to a further development of the invention, an amplitude modulator 51 can be inserted into the coupling from the output 26 of pulse generator 23 to the input 27 of grid control stage 28. This makes it possible to adjust the amplitude of the drive pulse A supplied to the input 27, e.g. by means of an adjustable resistor 53 connected to an input 52 of the amplitude modulator 51. With changing of the amplitude of the drive pulses A, the amplitude of the generated oscillator output is changed as well. The adjustment value necessary for this can be supplied to the input 52 alternatively from a switching element other than adjustable resistor 53. The slider of the adjustable resistor 53 may, if desired, be coupled to the tap 18 of potentiometer 19 so that the control value of the oscillator vibrational energy can be adjusted both by adjustment of the width of the control pulses and by adjustment of the pulse amplitude. In particular, it is possible to supply the controlled value F from the output 21 of comparator 17 via a line 58, indicated in dashed lines, to an input 54 of amplitude modulator 51 and, in this manner, to improve still further the control which is effected by varying the width of the control pulses.

FIG. 2 shows, with more detail, a grid control stage 28, in which an additional amplitude modulator 55 is provided. Between terminal 5, connected to the grid of triode 1, and ground there is coupled the series connection of a first grid resistor 41 and a second grid resistor 42. The junction of the two resistors is coupled to a negative voltage source 44 via a third grid resistor 43. As a result, a negative blocking voltage is supplied to the second grid resistor 42 which maintains triode 1 cut off. The collector-emitter path of a transistor 45 is connected in parallel with the second grid resistor 42. When the normal pulses are supplied to transistor 45 from the terminal 27, resistor 42 is short circuited. Triode 10 is then able to operate in a self-oscillating manner.

When the first control pulse is applied at terminal 32, a further transistor 46 is rendered conductive to provide a connection between a positive voltage source 47 and the grid of triode 1, via terminal 5. Triode 1 is momentarily turned on thereby to a maximum so that the oscillator starts its oscillations immediately with full amplitude.

Terminal 33 is connected to the base of a transistor 48, the collector-emitter path of which, when triggered by an inhibitory pulse, establishes a direct connection between the negative voltage source 44 and control terminal 5. When the second control pulse occurs at the input 33, triode 1 is momentarily and immediately cut off so that the high-frequency oscillations are interrupted.

The third grid resistance 43, between the negative supply source 44 and ground, prevents a short circuit from source 44 to ground when transistor 45 conducts. Moreover, the negative voltage occurring in the quiescent state at the resistance 42 is adjusted thereby so that triode 1 is maintained de-energized when no triggering pulse occurs from the terminal 27, i.e. during the interval between pulses.

The amplitude of the drive pulses A, which control transistor 45, is controlled by amplitude modulator 55. The width-modulated drive pulses A from the generator 23 are supplied to input terminal 27 of amplitude modulator 55 with constant amplitude. An adjustment voltage is supplied to amplitude modulator 55 from terminal 56, which adjusts its amplification. In FIG. 2, this is indicated by an adjustable resistor 57. If necessary, in accordance with the dashed line 58 in FIG. 1 to the input 54, it is also possible to supply the control value from the output 21 of comparator 17 via the terminal 58 to a further input of amplitude modulator 55 so that the amplitude can also be influenced in accordance with the control value.

On the one hand it is possible for transistor 42 to set a certain value for the grid current of the oscillator triode 1 in the oscillating state. It is also capable, however, of acting as a variable resistance which is located in parallel with fixed resistance 42, and thus to reduce resistor 42 to a desired degree during the current flow intervals.

Although the present invention has been described with reference to preferred embodiments, rearrangements and modifications can be made, and still the result will be within the scope of the invention.

What is claimed is:

1. A circuit for supplying electrical pulses to a gas discharge path, said circuit comprising:
   an oscillator circuit (1) having a power terminal adapted to be connected to an unregulated voltage source (3) for receipt of operating voltage therefrom, an input terminal (5) for receipt of triggering pulses (S), and an output terminal for providing an oscillator signal;
   output means (11, 13) coupled to said oscillator circuit output terminal and adapted to be coupled to the gas discharge path (12) for application of the oscillator signal thereto; a first control circuit (15-31) coupled to said oscillator output terminal for generating drive pulses (A) having a pulse width which varies from a preset width as a function of the variation of the oscillator signal from a predetermined value; and
   a grid control circuit (28) coupling the first control circuit to the oscillator circuit, said grid control circuit responsive to the drive pulses for applying triggering pulses to said oscillator circuit to trigger operation thereof.

2. A circuit for supplying electrical pulses to a gas discharge path, said circuit comprising:
   an oscillator circuit (1) having a power terminal adapted to be connected to an unregulated voltage source (3) for receipt of operating voltage therefrom, an input terminal (5) for receipt of triggering pulses (S), and an output terminal for providing an oscillator signal;
   output means (11, 13) coupled to said oscillator circuit output terminal and adapted to be coupled to the gas discharge path (12) for application of the oscillator signal thereto;
   a demodulating circuit (15) coupled to said oscillator output terminal for providing an electrical signal (M) indicative of the oscillator signal;
   a comparator (17) connected to said demodulating circuit and adapted to be connected to a control voltage source (18) for providing a comparison signal (F) indicative of the comparison between the electrical signal from said demodulating circuit and the control voltage;
   a pulse generator (23) having a control input (22) connected to said comparator for receipt therefrom of the comparison signal, for generating drive pulses (A) having a pulse width determined by the comparison signal; and
   a grid control circuit (28) coupling the pulse generator to the oscillator circuit, said grid control circuit responsive to the drive pulses for applying the triggering pulses to said oscillator circuit to trigger operation thereof.

3. A circuit as claimed in claim 1 or 2 wherein said grid control circuit comprises a first pulse converter (30) responsive to initiation of a drive pulse for generating a short duration positive electrical pulse (Ka), a second pulse converter (31) responsive to termination of the drive pulse for generating a short duration negative electrical pulse (Kb), and means (41-48) for superimposing the positive electrical pulse on the leading edge of the drive pulse and the negative electrical pulse on the trailing edge of the drive pulse to provide a triggering pulse.

4. A circuit as claimed in claim 1 wherein said first control circuit includes mean (51) for controlling the magnitude of the drive pulses as a function of the variation of the oscillator signal from the predetermined value.

5. A circuit as claimed in claim 2 wherein said pulse generator includes means (51) for controlling the magnitude of the drive pulses as a function of the comparison signal.

6. A circuit as claimed in claim 1 or 2 wherein said oscillator circuit includes amplitude control means for increasing the amplitude of the oscillator signal in response to an increase in the width of the triggering pulses.

7. A circuit as claimed in claim 6 wherein said amplitude control means includes means for decreasing the amplitude of the oscillator signal in response to a decrease in the width of the triggering pulses.

8. A circuit as claimed in claim 7 wherein said amplitude control means has a greater time constant than does said pulse generator so that the increase and decrease in the amplitude of the oscillator signal is effected with a greater time constant than variations in the width of the triggering pulses.

9. A circuit as claimed in claim 1 wherein said grid control circuit includes amplitude control means (55) for controlling the magnitude of the triggering pulses as a function of the variation of the oscillator signal from the predetermined value.

10. A circuit as claimed in claim 9 wherein said amplitude control means includes an adjustable control source (57, 58) for adjusting the degree of control of the magnitude of the triggering pulses as a function of the variation of the oscillator signal from the predetermined value.

11. A circuit as claimed in claim 10 wherein said amplitude control means comprises an amplifier responsive to the adjustment of said adjustable control source.

12. A circuit as claimed in claim 2 wherein said grid control circuit includes amplitude control means (55) for controlling the magnitude of the triggering pulses as a function of the comparison signal.

13. A circuit as claimed in claim 12 wherein said amplitude control means includes an adjustable control source (57, 58) for adjusting the degree of control of the magnitude of the triggering pulses as a function of the comparison signal.

14. A circuit as claimed in claim 13 wherein said amplitude control means comprises an amplifier responsive to the adjustment of said adjustable control source.

15. A circuit as claimed in claim 13 or 14 wherein said amplitude control means comprises means (58) responsive to the comparison signal.

16. A circuit as claimed in claim 1 wherein said first control circuit includes means for controlling the drive pulses as a function of the variation of voltage from a voltage source connected to said power terminal.

17. A circuit as claimed in claim 2 wherein said demodulating circuit includes means for controlling the electrical signal (M) as a function of the variation of voltages from a voltage source connected to said power terminal.

18. A circuit as claimed in claim 2 wherein said comparator includes means (29) for adjusting the electrical signal (M) in a non-linear manner before comparison thereof with the control voltage.

19. A circuit as claimed in claim 1 or 2 further comprising a casing member (34) enclosing said oscillator circuit and said output means and adapted to enclose the gas discharge path.

20. A circuit as claimed in claim 19 wherein said casing member comprises a electrically shielding member.

21. A circuit as claimed in claim 14 further comprising a tuned coupling member (10) connecting said oscillator circuit to said output means.

* * * * *